US010242252B2

(12) United States Patent
Venkataraman et al.

(10) Patent No.: US 10,242,252 B2
(45) Date of Patent: Mar. 26, 2019

(54) EXPRESSION RECOGNITION TAG (71) Applicant: Intel Corporation, Santa Clara, CA (US)

(72) Inventors: Aishwarya Venkataraman, Bangalore (IN); Vishal Thomas, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/866,392

(22) Filed: Sep. 25, 2015

(65) Prior Publication Data
US 2017/0091534 A1 Mar. 30, 2017

(51) Int. Cl.
G06K 9/00 (2006.01)
G06F 17/30 (2006.01)

(52) U.S. Cl.
CPC ..... *G06K 9/00302* (2013.01); *G06F 17/30256* (2013.01); *G06F 17/30268* (2013.01); *G06F 17/30867* (2013.01)

(58) Field of Classification Search
None
See application file for complete search history.

(56) References Cited

U.S. PATENT DOCUMENTS

| 6,585,521 | B1* | 7/2003 | Obrador | G09B 23/28 369/27.01 |
| 8,232,979 | B2* | 7/2012 | Cohen | G06F 3/03545 178/18.01 |
| 8,235,725 | B1* | 8/2012 | Hill | G06Q 30/02 434/236 |
| 8,922,481 | B1* | 12/2014 | Kauffmann | G06F 1/163 345/156 |
| 9,299,248 | B2* | 3/2016 | Lake | G08C 17/02 |
| 9,336,535 | B2* | 5/2016 | Pradeep | A61B 5/0476 |
| 9,521,960 | B2* | 12/2016 | Lee | A61B 5/0205 |
| 2003/0165270 | A1 | 9/2003 | Endrikhovski et al. | |
| 2008/0065468 | A1* | 3/2008 | Berg | G06Q 30/02 705/7.32 |
| 2008/0120113 | A1* | 5/2008 | Loyall | G06F 3/011 704/270 |
| 2011/0016004 | A1* | 1/2011 | Loyall | G06F 3/011 705/14.72 |
| 2012/0002848 | A1* | 1/2012 | Hill | A61B 5/164 382/118 |

(Continued)

OTHER PUBLICATIONS

CN106024014A translation in English,Zhang et al. May 24, 2016.*
International Search Report, PCT Application No. PCT/US2016/046479, date of completion Nov. 18, 2016, 3 pages.

*Primary Examiner* — Nancy Bitar
(74) *Attorney, Agent, or Firm* — International IP Law Group, P.L.L.C.

(57) ABSTRACT

An apparatus for tagging content with expression recognition information is disclosed herein. The apparatus can include an input collector to receive raw expression data at a data storage device, the raw expression data to correspond to a media event. The apparatus can include an expression recognition generator to create an expression tag by coding the received raw expression data to follow an expression action coding system. The apparatus can include a content modifier to modify a deliverable content instance for the media event to include the expression tag.

24 Claims, 7 Drawing Sheets (56) References Cited

U.S. PATENT DOCUMENTS

| | | | | |
|---|---|---|---|---|
| 2014/0111323 A1* | 4/2014 | Strout | ............. | B60S 1/0491 |
| | | | | 340/425.5 |
| 2015/0172541 A1* | 6/2015 | Anderson | ............. | H04N 5/232 |
| | | | | 348/218.1 |
| 2016/0048369 A1* | 2/2016 | Zenoff | ............. | G06F 3/1454 |
| | | | | 715/734 |

* cited by examiner

```
                        Expression Tag

<metadata>
<file>FearFactor-AugSeason.avi</file>
<url>http://www.youtube.com/watch?v=M3pRWs7vQaQ</url>
    <expression id = "1">
        <expression_type>smile</expression_type>
        <datetime>07/23/2012 10:30:04UTC</datetime>
        <content_section_time_sec>30</content_section_time_sec>
        <duration>7</duration> <!--duration of expression in seconds-->
        <location>US</location>
    </expression>
<expression id = "2">
        <expression_type>laugh</expression_type>
        <datetime >07/23/2012 10:30:04UTC</datetime>
        <content_section_time_sec>30</content_section_time_sec>
        <duration>10</duration>
        <location>US</location>
    </expression>
<expression id = "3">
        <expression_type>cry</expression_type>
        <datetime >07/23/2012 10:45:10UTC</ datetime>
        <content_section_time_sec>50</content_section_time_sec>
        <duration>60</duration>
        <location>US</location>
    </expression>
<expression id = "4">
        <expression_type>sad</expression_type>
        <datetime >07/23/2012 10:45:10UTC</ datetime>
        <content_section_time_sec>50</content_section_time_sec>
        <duration>45</duration>
        <location>US</location>
    </expression>
</metadata>
```

EXPRESSION RECOGNITION TAG

TECHNICAL FIELD

The present techniques relate generally to expression recognition. More specifically, the present techniques relate to expression recognition associated with a media event, where the recognized expression can be added to the media file.

BACKGROUND ART

Web content today have metadata based on static keywords and tags. Metadata can also include information generated about the file including authorship, date created, file size, and other similar categories. The metadata of a file contrasts with the content of a file, in that the content of a file is generally shown to a user while the metadata can be viewed by a user interested in information about the file itself rather than information the file otherwise contains.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Different information and media can instigate different emotions within a person based on the kind of content it offers. These emotions can be expressed by facial and audible expressions. While people's expressions vary based on culture and geographic location, the human emotional system can include certain spontaneous emotions like anger, disgust, fear, happiness, sadness, and surprise irrespective of the background of a user. Users can convey emotional information both when multiple users are present and when solely in the presence of a non-human medium like television or laptop. A user's natural expression can be read with an input device, and metadata generated based on the input information gathered while the user or users consumed the media event.

As discussed herein, an expression can be a combination of facial muscle movements like eyebrow movement, lowering or raising of eyelids, lip movement and raise or drop in jaw, or any other similar visual cues. In an example, the expression can also be audible cues and sounds such as detected inflection changes in a user voice, sounds of laughter, crying, shock, or other similar audible cues. In an example, the media projection or presentation itself can have audible and visual output that can be detected incidentally to other input detection, capture, and receipt. Source sounds and images originating from the media, can also be filtered out, in some cases using the underlying data to determine which aspects can be filtered out. The expression tagging disclosed herein can leverage the intelligence of existing expression detection systems as well as the sensors that have market to build this system.

The raw expression data that can be captured can include text, an image, an audible sound, and video. The media being displayed or played through a media event that may be causing expressions by a viewer can come from a deliverable content instance with content and also with metadata associated to the deliverable content instance. A deliverable content instance can be a file, a partial file, a stream of data, a partial stream of data or any other suitable means of transmitting data that can include content. The content, as discussed herein can include video data, image data, audio data, or any combination of these or other data types for a user. The deliverable content instance can be sent from one source or from many sources. Likewise, depending on the system of data transferal, aggregation, and processing, the deliverable content instance can be sent to one destination or many destinations in its entirety, is smaller portions, or as part of a larger aggregation of data in any way suitable for transmitting this information.

The metadata associated with the deliverable content instance can include the Author of the content, keywords that help in classifying the content, when the deliverable content instance was created, where the content was viewed, and other suitable metadata information. The raw expression data can be used to generate an expression tag, to indicate an expression or expression change. In an example, the expression tag can be added as additional metadata or to existing metadata associated with the content that may have caused the expression by the viewer. The expression can be a factor to indicate how the content can be perceived by the user.

Figure 1A:
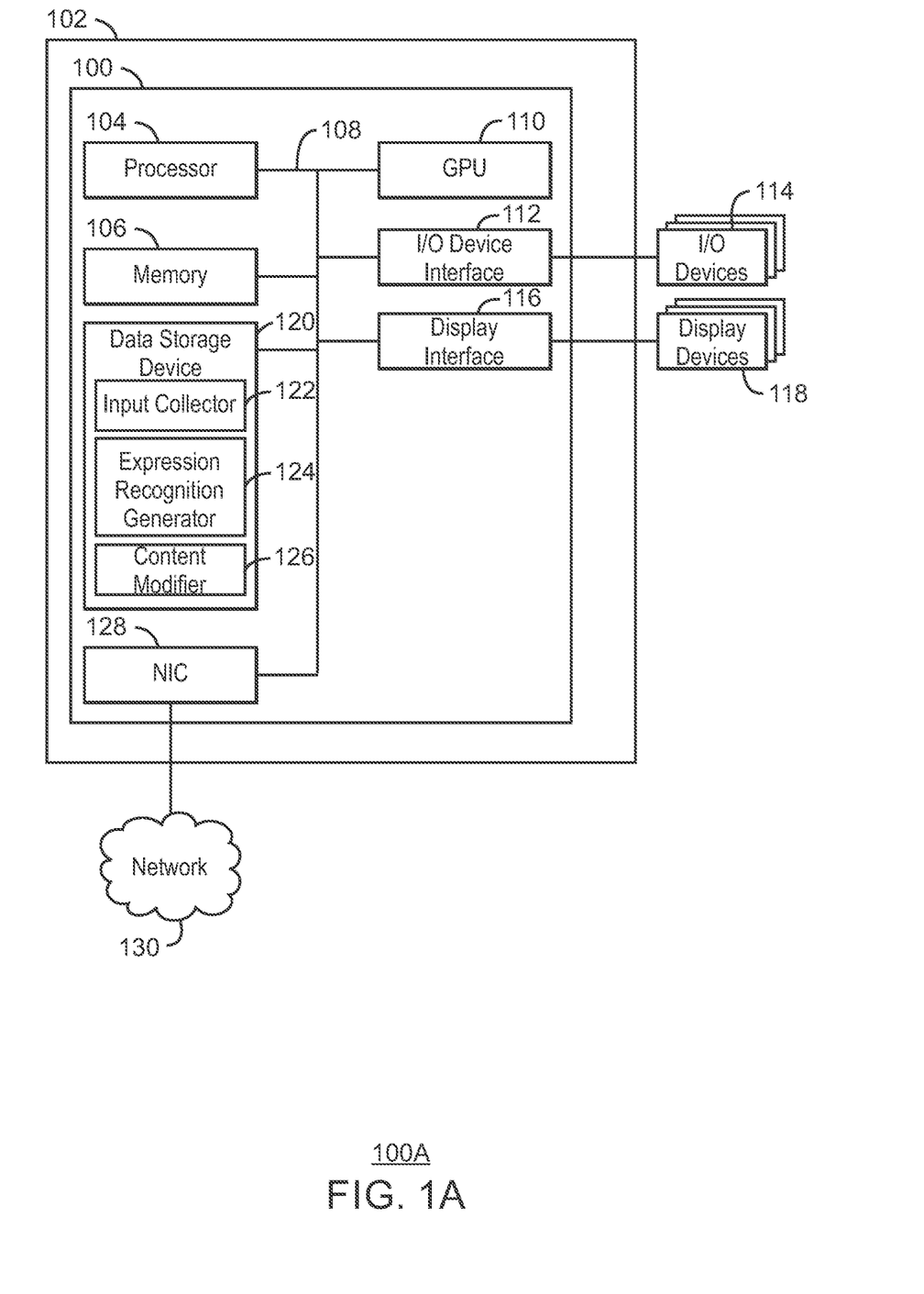
FIG. 1A shows a block diagram of an example system on chip (SoC) on a printed circuit board (PCB) for expression recognition tagging.

FIG. 1A shows a block diagram of an example system 100A on chip (SoC) 100 on a printed circuit board (PCB) 102 for expression recognition tagging. The SoC 100 and PCB 102 may be components of, for example, a laptop computer, desktop computer, Ultrabook, tablet computer, mobile device, mobile phone, or server, among others. The SoC 100 may include a central processing unit (CPU) 104 that can be configured to execute stored instructions, as well as a memory device 106 that stores instructions that are executable by the CPU 104. The CPU may be coupled to the memory device 106 by a bus 108. Additionally, the CPU 104 can be a single core processor, a multi-core processor, a computing cluster, or any number of other configurations. Furthermore, the SoC 100 may include more than one CPU 104.

The SoC 100 may also include a graphics processing unit (GPU) 110. As shown, the CPU 104 may be coupled through the bus 108 to the GPU 110. The GPU 110 may be configured to perform any number of graphics functions and actions. For example, the GPU 110 may be configured to render or manipulate graphics images, graphics frames, videos, or the like, to be displayed to a user of the SoC 100. The memory device 106 can include random access memory (RAM), read only memory (ROM), flash memory, or any other suitable memory systems. For example, the memory device 106 may include dynamic random access memory (DRAM).

The CPU 104 may be connected through the bus 108 to an input/output (I/O) device interface 112 configured to connect with one or more I/O devices 114. The I/O devices 114 may include, for example, a keyboard and a pointing device, wherein the pointing device may include a touchpad or a touchscreen, among others. The I/O devices 114 may be built-in components of a platform including the SoC 100, or may be devices that are externally connected to a platform including the SoC 100. In embodiments, the I/O devices 114 may be a keyboard or a pointing device that can be coupled with the I/O device interface 112 via a multiple protocol connection, such as a USB Type-C connection, similar to the USB package, MUX, and USB devices described below.

The CPU 104 may also be linked through the bus 108 to a display interface 116 configured to connect with one or more display devices 118. The display devices 118 may include a display screen that can be a built-in component of a platform including the SoC 100. Examples of such a computing device include mobile computing devices, such as cell phones, tablets, 2-in-1 computers, notebook computers or the like. The display device 118 may also include a computer monitor, television, or projector, among others, that can be externally connected to the SoC 100. In embodiments, the display devices 118 may be a DisplayPort device that can be coupled with the display interface 116 interface via a multiple protocol connection, such as a USB Type-C connection, similar to the USB package, MUX, and USB devices described below.

In embodiments, the plurality of peripheral devices such as I/O devices 114, display devices 118, and USB devices be authenticated using a first domain or protocol. After authentication in the first domain or protocol, the peripheral devices can be released to operate in the desired operating domain. A number of authentication techniques may be used, such as mutual authentication, PKI, or other crypto techniques.

The SoC 100 may also be coupled with a data storage device 120. The data storage device 120 may be a component located on the PCB 102. Additionally, the data storage device 120 can be a physical memory such as a hard drive, an optical drive, a thumb drive, an array of drives, or any combinations thereof. The storage device 120 may also include remote storage drives. The data storage device 120 can include an input collector 122 to receive raw expression data corresponding to a media event. In an example, the raw expression data comes in the form of an image file, a video file, an audio file, or another suitable deliverable content instance for use during expression recognition. The raw expression data can be collected by the input collector 122 and can include data received digitally from within the SoC 100, and can also instruct the capture of images, sounds, and other potential inputs for raw expression data.

The data storage device 120 can also include an expression recognition generator 122 to create an expression tag from the raw expression data and an expression action coding system. Raw expression data can be identified and broken down into various components for different actions and body parts and sounds. The raising of both eyebrows can be detected in the raw expression data and a smile can be detected in the raw expression data. In an example, an expression recognition generator can compare the raising of eyebrows and a smile to an expression action coding system to return a "happy" output, or other expression type corresponding to the received inputs. The comparison to of the identified components of raw expression data to the expression action coding system stored in the data storage device 120 can be the result in a generated expression tag, e.g. "happy" that can be further used.

The data storage device 120 can also include a content modifier 126. The content modifier 126 can modify a deliverable content instance or data associated with the deliverable content instance in order to include the expression tag associated with the content that may have caused the expression by the user. the content modifier 126 can modify the deliverable content instance containing the content used as media in the media event or the content modifier 126 can modify a deliverable content instance or data associated with the deliverable content instance used in generated the media event while not being a part of the same deliverable content instance.

The SoC 100 may also include a network interface controller (NIC) 128 may be configured to connect the SoC 100 through the bus 108, various layers of the PCB 102, and components of the PCB 102 to a network 130. The network 130 may be a wide area network (WAN), local area network (LAN), or the Internet, among others.

It can be understood that the block diagram of FIG. 1 may not include all of the components, nor are all components included in each version of the SoC 100. Rather, the SoC 100 can include fewer or additional components not illustrated in FIG. 1. Furthermore, the components may be coupled to one another according to any suitable system architecture, including the system architecture shown in FIG. 1 or any other suitable system architecture that uses a data bus to facilitate communications between components. For example, embodiments of the present techniques can also be implemented any suitable electronic device, including ultra-compact form factor devices, such as SoC and multi-chip modules. The present techniques may also be used on any electrical cable inside or outside of a computer that can be used to carry digital information from one point to another. For example, embodiments of the present techniques may be used for connecting disk drives.

Figure 1B:
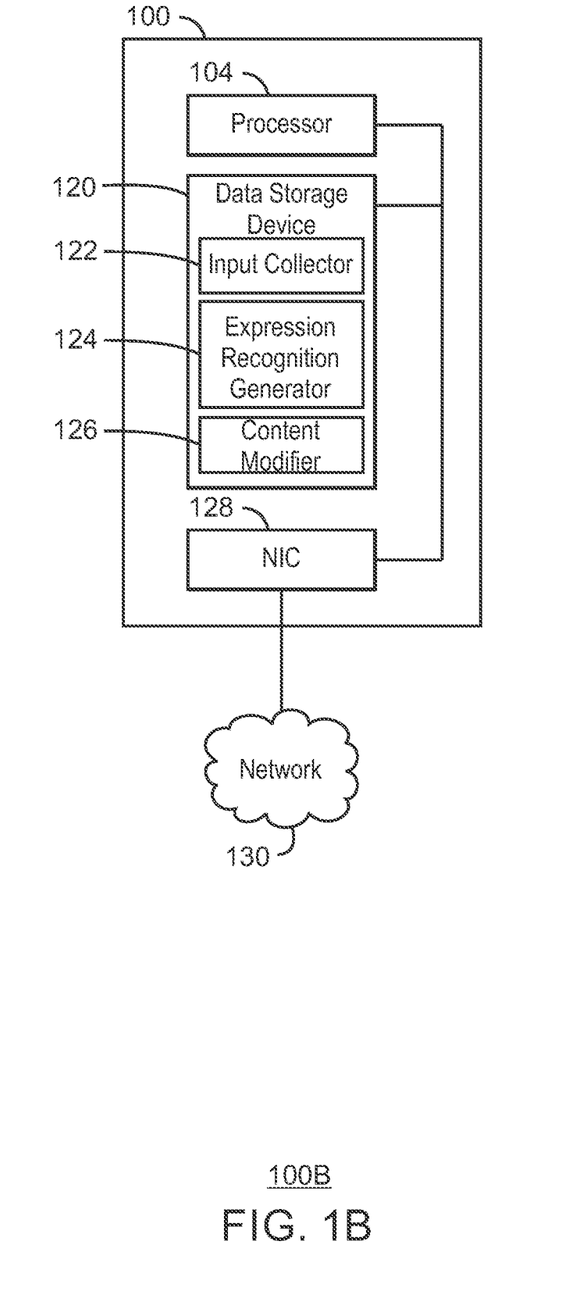
FIG. 1B shows a block diagram of a simplified example of a system for expression recognition tagging.

FIG. 1B shows a block diagram of a simplified example of a system 100B for expression recognition tagging. Like numbered items are as described above for FIG. 1A.

In an example, the SoC 100 can receive data from the network 130 at the NIC 128. The data received can be stored in the data storage device 120. The data stored in the data storage device 120 can be collected by the input collector 122 and identified as raw expression data. In an example, the input collector can receive the raw data at the storage device periodically. In an example, the periodic collection of data can occur in a range of seconds, in a range of minutes, or any other suitable and variable time frame. The input collector 122 can pass the collected raw expression data to the expression recognition generator 124. The expression recognition generator 124 can create an expression tag based on the raw expression data. The expression tag can include an expression type, a media event section time, a duration, a timestamp of the time the raw expression data used for the expression was captured, a location, and other suitable data. In an example, expression type can include happy, sad, angry, laughing, surprised, or any other suitable emotion or expressive feeling that can be expressed through visual or audible cues. The expression tag can include a media event identifier to associate the expression tag to a particular item or deliverable content instance of media that was displayed or played to possibly cause the user to express an expression. The media event section time can include a section of a single piece of media content of a media event that can be a subset of the total time of the media content.

A user can express several expression types during different times in the same media whether it be text, video, photograph, slideshow, interactive game, music playing, or any other media content. In this example, the different expressions can occur at varying times throughout the media content, and accordingly an expression tag can be given varying media event section times as the media that may have caused the expression by the user can be in various sections of the media. There are multiple viewers of the same media on the same device, and an expression recognition generator 124 can recognize, in the raw expression data, the presence of multiple people with potentially differing expressions to the same content. In this example, the expression recognition generator 124 can assign each person an expression in the generation of the expression tag to be associated or added to the deliverable content instance for the media event by the content modifier.

Figure 2:
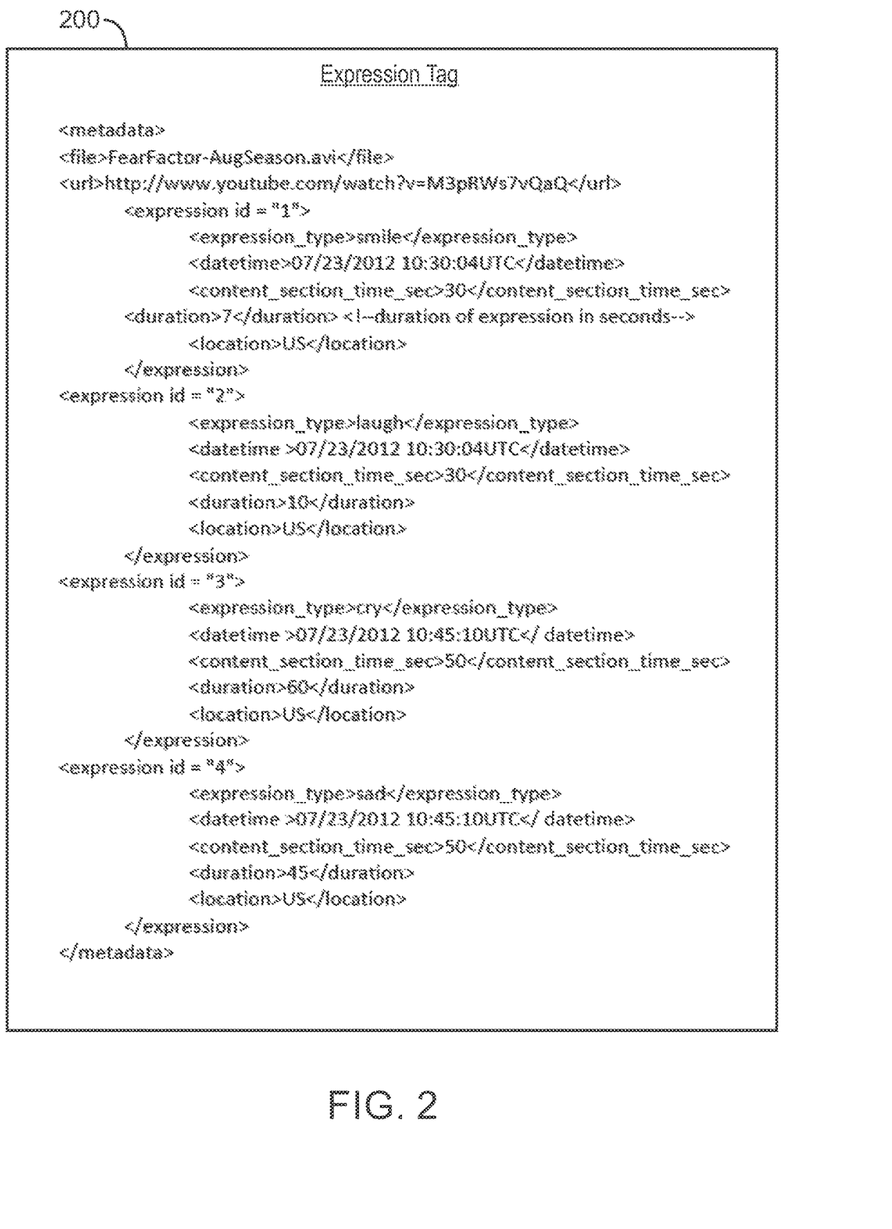
FIG. 2 shows an example of an expression tag in the form of metadata code.

FIG. 2 shows an example of an expression tag 200 in the form of metadata code. The expression tag shown can be transported, manipulated, added, or used similarly by objects discussed above for FIG. 1.

The expression tag 200 can be stored with a deliverable content instance containing the media that may have caused a user to have an expression, or the expression tag can be stored separated outside of the media, but still associated with the deliverable content instance. The expression tag 200 can be sent through a port to a network 130 with a media event identifier, the media event identifier to identify the media the expression tag 200 associates with. In an example, the expression tag 200 can be sent to a network and grouped with other expression tags 200 with similar media event identifiers.

This grouping of expression tags 200 with the same media event identifiers can allow a comparison on a larger scale of what a larger number of users expressed during the display of the media associated with the media event identifier. In an example, this grouping of expression tags 200 can allow greater statistical interpretation of the expressions displayed for various media events, and can also allow statistical interpretations of the information about the various users, device, and locations the media event has been shown including the types of expressions made by users of a particular age, region, device platform, based on duration and number of times a particular media was watched or other factors occurring during a media event.

In FIG. 2, the expression tag 200 shown can illustrate the data generated by an expression recognition generator 124 based on raw expression data received by an input collector 122. A group of friend can be watching a video stream together on a computing device. An I/O device 114, such as a web camera or a microphone or other suitable device can capture a real time image or video or other raw expression data from any user within range of these devices. This raw expression data can be received by the input collector 122 and passed onto the expression recognition generator 124. The expression recognition generator 124 can infer an expression based on the raw expression data for each person for which raw expression data can be captured at the input collector 122. In an example, the raw expression data can be captured by the input collector 122 periodically. The expression recognition generator 124 can generate an expression tag periodically, e.g. every 3 seconds.

The expression recognition generator can create an expression tag in the form of metadata to be inserted or associated with the media deliverable content instance. As discussed above, expression calculation and tag generation can be performed in periodic or specified intervals as provided by the author of the content to build the metadata. Through the periodic capture of expressions, some of the shorter lived expressions, which can be posed or faked, are largely removed from the metadata of the expressions associated with the deliverable content instance. The spontaneous and authentic expressions and movements can be smooth and ballistic compared to posed or faked expressions which can be jerky and short lived. The periodic gathering of expressions to eliminate the large share of posed or faked expressions can be combined with a comparison engine to aid in the determination of a feature's movement relative to the feature's previous position. In an example, the generated expression tag can be stored as metadata in the deliverable content instance of the media, and can also be stored in a network that associates the expression tag with a particular media and other gathered user attributes. Each expression tag can include a media event identifier, a media event section time, and a timestamp, among other suitable identifiers to associate with the metadata or a media deliverable content instance. The identifiers for the metadata can be used by media creators to analyze the media content displayed for the user and determine ideal advertising opportunities, viewer preference for particular types of media, and other similar discoveries from authentic expression detection.

In FIG. 2, an expression tag 200 shows a sample metadata of 2 people watching a video stream together. In this example expression tag 200, Person1 smiles for a section for 7 sec while Person2 laughs for the same section for 10 sec. In expression tag 200, Person1 cries for a different section for 1 minute while Person2 poses a sad face for the same section for 45 sec. In this example expression tag 200, the term "expression_type" can show the expression of the viewer while viewing the content, such as happy, sad, angry, aroused, curious, surprised, sleepy, or any other similar expression. In this example expression tag 200, the term "content_section_time_sec" can show the section of the video when the expression was given by the viewer. The content_section_time_sec can be recorded as the number of seconds since the start of the video. In this example expression tag 200, if the media event included the reading of textual content separate from a video, the content_section time_sec can be blank or can be updated to represent actions and expressions made a certain time into clicking on media event with textual content. In expression tag 200, the duration can mean the duration of the expression during the media event. The term, or tag, or variable name, datetime can indicate or be a placeholder for a timestamp when the metadata was recorded. In this example expression tag 200, the term location can be the location of the user determined by the IP of the user or the user's preference settings.

Figure 3:
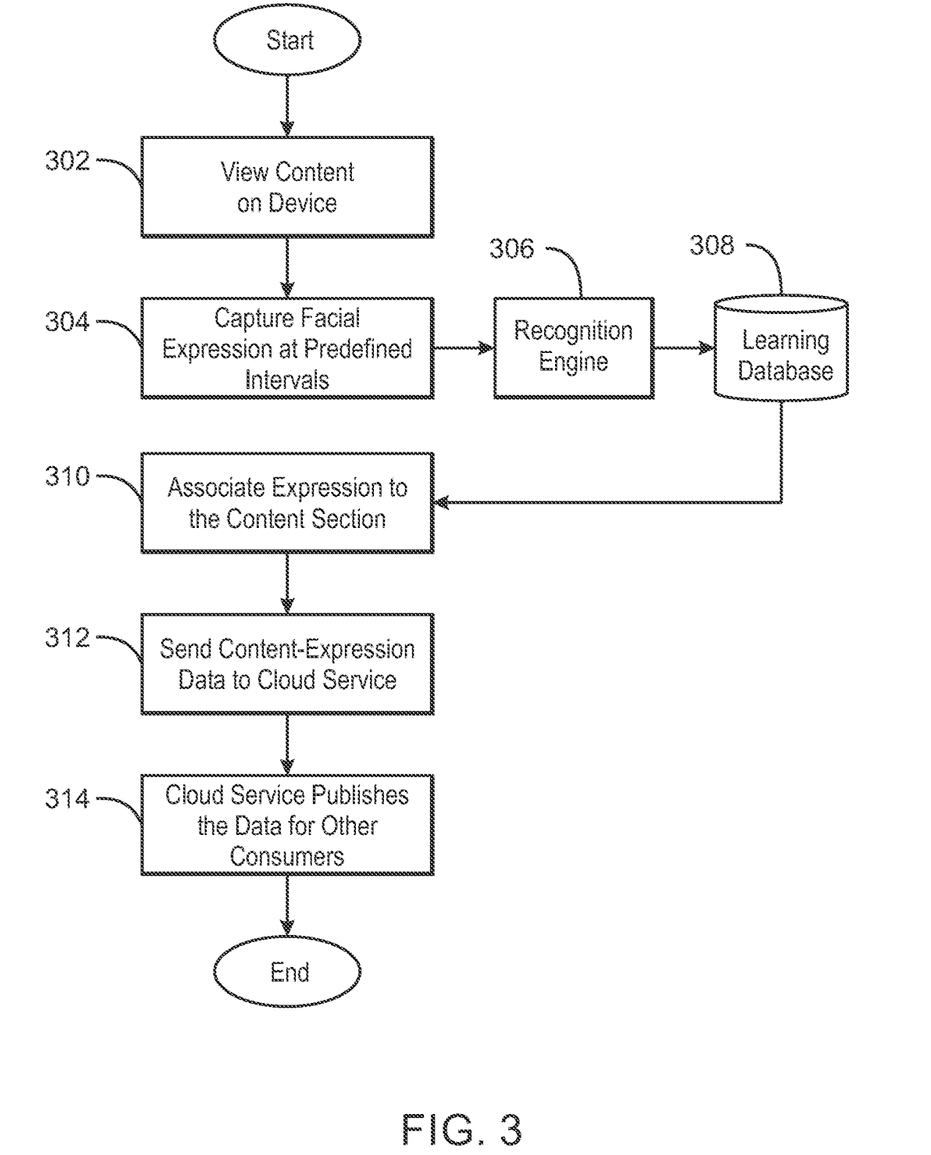
FIG. 3 shows a process flow diagram of an example method for expression recognition tagging.

FIG. 3 shows a process flow diagram of an example method 300 for expression recognition tagging. Process flow begins at block 302. Like numbered items in the below description can also be as described as above for FIG. 1 or 2.

At block 302, content can be viewed on a device such as a computing device implementing a SoC 100. In an example, the device can have image capture device or microphone to capture video of a user's face or sounds from a user during the user's viewing of media on the device.

At block 304, the raw expression data can capture the facial expressions and sounds using the I/O devices 114 of the computing device implemented with a SoC 100. This raw expression data can be captured periodically. The data captured can be received at an input capturer for identification 122 as expression data.

At block 306, the raw expression data that has been captured can be sent to a recognition engine to processes the expressions of the viewers. The expressions can be interpreted based on visual cues and identifications, the expressions can also include sounds indicating shock, ongoing laughter, or surprise. In an example the recognition can be compared to an expression action coding system which includes a database of various expressions to correspond to a meaning associated with various positions of physical feature and sound combinations. In an example, the expression action coding system can generate an initial result, where the initial result can be displayed to a human, in some cases the user, for confirmation of whether the approximation can be accurate or not. In an example this comparison can lead to results that can be used by a system implementing the SoC 100 to improve the expression recognition engine in block 306. The results from an expression confirmation can be stored and can also be implemented in a learning database 308.

An expression accuracy value can be generated based on a difference based on a number of correct expressions are identified by an expression type. In some examples, an expression accuracy value can be generated based on how close an expression identification was to the actual expression of the user. The expression accuracy value can be used to improve results of later iterations of expression calculation and tag generation. The result of the application of the learning database 308 and the expression action coding system to the raw expression data can allow an expression recognition generator 124 to generate an expression tag. The expression tag can also include a geographic tag based on a location identifier associated with the raw expression data. The location identifier associated with the raw expression data can indicate the location the raw expression data was recorded or detected. The expression tag can also include viewer gaze information which can include a detected location on the display where a viewer is looking from the raw expression data and associates the location to the media event being displayed.

At block 310, the expression tag can be associated to the content section of the content of the media deliverable content instance played or displayed by the device in block 302. The association of metadata to the content section can be by insertion of metadata into the deliverable content instance. In some examples, the expression tag can be associated with the deliverable content instance, although the expression tag itself may not be added to the content or media deliverable content instance itself.

At block 312, the media deliverable content instance with the content-expression data, or the content plus the expression tag, can be sent to a cloud service or network 130. In an example the expression tag can be associated with a particular media and also a media section, e.g. a time during the media where the expression may have been recorded. The sending of content-expression data to a cloud service allows the data from many devices to be aggregated to produce large amounts of data for each media deliverable content instance and each section of content watched. The large number of expressions gathered from users viewing the same media deliverable content instance can be used in performing statistical analysis to identify trends related to the media deliverable content instance and content viewed. In an example, the metadata can be sent to a cloud, or network, to allow the content author of the media content use this data to calculate an average of the expressions from different viewers and apply this statistical information to future media deliverable content instances or advertisements the content author may choose to display.

At block 314, the gathered data, or conclusions drawn by the content author can be published for use by additional content authors, for use by the users to view the data they have be transmitting, for use by third parties in the generation of additional tools for the delivery of media based on expressions and emotions of the users. In a further examples, the gathered feedback on a visceral level based on expressions gathered can provide additional information about a user or consumer without additional intrusive interrogation. Accordingly, the providing of this data for other consumers can be exchanged for other valuable information or access to additional data.

In an example, the use of expression tags to add metadata or user expression data to the deliverable content instance for a text file, video file, news article, interactive game can provide additional information over typical feedback surveys that rely on conscious user emotional thought or introspection. In an example, the user of expression tags based on expressions gathered and calculated from a user while the user reads an article provides a more meaningful indicator of what a person may actually feel compared to various user generated tags, comments, or other user initiated feedback mechanisms. Further, the incorporation of periodic expression generation or capture can allow a metric for which expression was most frequent during a media event. A media deliverable content instance can include content and metadata. In an example a media event can be display or playing of the content of the media deliverable content instance for a user. In an example the detected and converted expression can include designations of time when the expressions occurred thereby establishing a duration. Of a number of expressions detected for a media deliverable content instance, the expression detected for the most occurrences or the longest duration can be used to tag the article.

In an example of a media deliverable content instance such as a 90 minute movie, expressions of a user can change based the scene being played. In this example, these different expressions can be added in metadata to include indications of the corresponding section of the video rather than through the adding of a single emotional tag to categorize the complete video. The expression tag stored as metadata can be used to augments search ratings based on keywords and total hits, specifically those for emotions a searcher may be seeking in a network 130 or cloud.

The expressions detected can be used to aid in delivery of appropriate advertisements. In an example, advertisements can be embedded to the particular articles and the particular sections of a media, such as a video, based on the sections of the video expression data suggests the users enjoy the most, or associate with an emotion the advertiser desires their product to be shown during. if the media can be shown through a television or streaming show online through direct to home (DTH) providers, the present disclosure can increase the accuracy and procession of ratings systems about the quality of a show and also what kind of show many users expect on an episode by episode basis.

In an example, the expression recognition generator 124 can create an expression tag 200 differently depending on the location the raw expression data can be being gathered from. In an example the culture and emotional reaction for happiness in one culture or region of the world can vary from the degree of intensity and expression displayed in another region of the world. Based on expression tags 200 from a number of regions, a content author can generate tailor-made content depending on the statistics generated on a region by region basis. Further, in addition to expressing emotions differently, various content may be received differently in different regions. An American audience may react to action and violence in a video differently than a user from Europe or India. Accordingly, expression tags 200 can include this information when coding the expressions for inclusion or association with a deliverable content instance.

An example for this method, as well as in other implementations described herein, includes limiting or blocking the collection of the expression data, for the expression tag. The limiting can be based on an input received from a user, and in some implementations, can be the default setting of a method, thereby skipping other actions. The limiting of data collection can be governed by user input in an opt-in system, for example, a policy approval model. The limiting of collection data can also be automatically defaulted to a device or system, but can also be an opt-out system where a collection of expression data and tags must be rejected by a user through modulation of settings.

Even though the process of FIG. 3 appears in a particular order with a certain number of steps these steps may not all be present, nor do they represent every step or action that can be taken in the process. Further, the order of the actions and the fact that they are shown as distinct should not be read as limiting on the scope of the present disclosure as any combination and order accomplishing the expression identification aims of the disclosure can also be included in the present disclosure.

Figure 4:
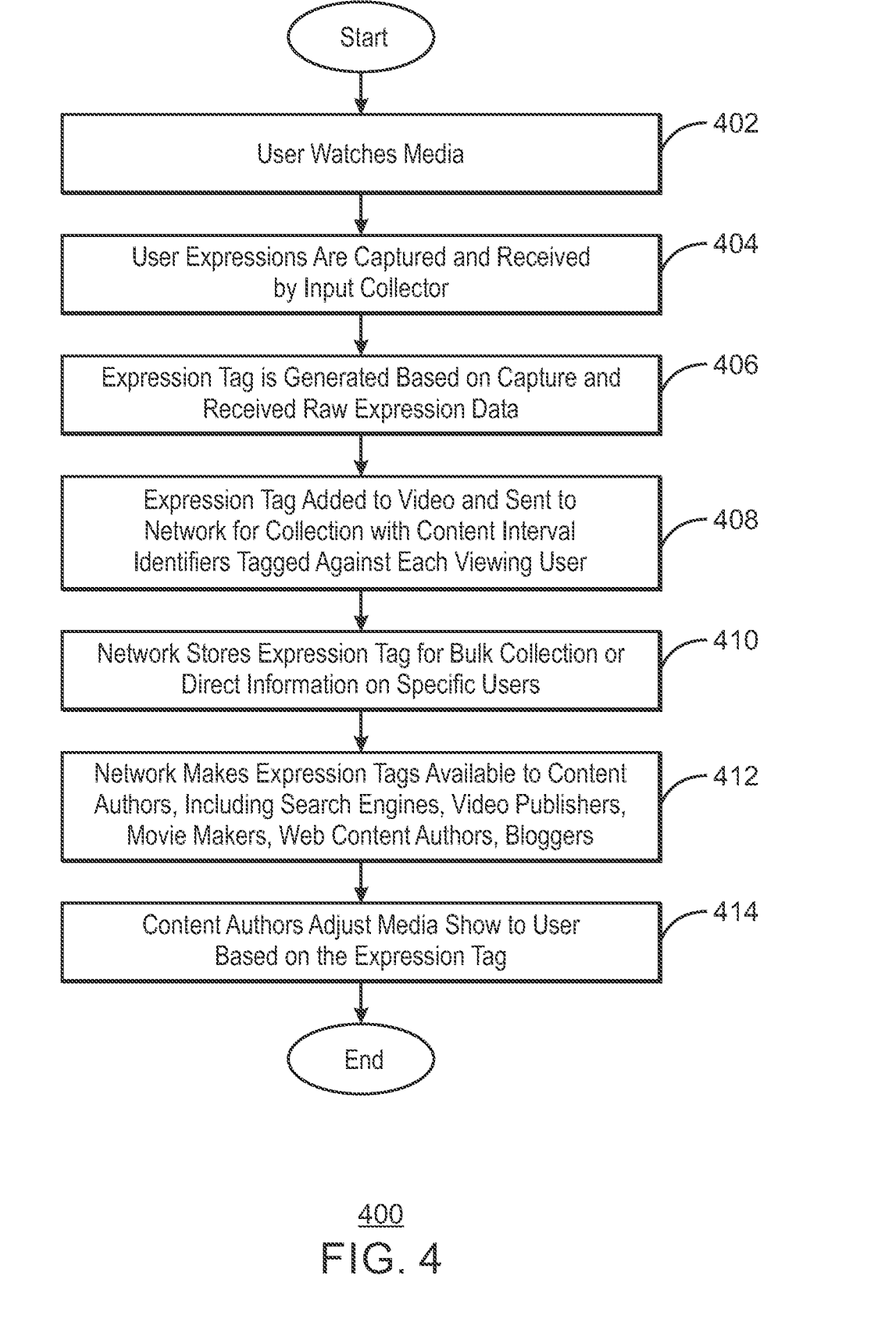
FIG. 4 shows a process flow diagram of an example method for expression recognition tagging and media modification.

FIG. 4 shows a process flow diagram of an example method 400 for expression recognition tagging and media modification. Process flow begins at block 402. The method of FIG. 4 can be implemented on a SoC 100 seen in FIG. 1A, or any other suitable device using techniques discussed in FIG. 1B and FIG. 2 as well.

At block 402, a user watches a media. The watching of media here may be used as an inclusive way of a user consuming any mode of media including listening to music, playing a video game, watching a TV show, browsing an internet page, or listening to an article.

At block 404, the user's expressions can be captured and received by an input collector. The capture of these expression can be performed by I/O devices 114 of the same device storing the expressions. In an example, the expressions, can also be captured remotely by a separate device that can transmit the captured raw expression data to the input collector 122 for storage and identification as features of a user or several users.

At block 406, the raw expression data can be used to generate an expression tag. The expression tag can be generated from any data gathered combined with the raw expression data such that authorship, time of creation, time of transmittal, type of device, and any other similar information known about the expression being described by the expression tag. The expression tag can include an expression type that can express the emotion or state of the expression including a determination that the expression best represents a happy expression, a sad expression, a surprised expression, or any other detectable expression based on visible, audible, or other sensory data captured as raw expression data.

The expression type in calculated from the raw expression data based on a facial action coding system (FACS). FACS, a coding system for behavioral science, can base the expression type on detected facial muscle movement. In an example of FACS, an image of a face can be captured and analyzed to determine if a face can be detected within the image. A user's eyes are located within the face in a recorded image. In this example, the eyes can be points of reference to determine the movement of other facial muscles over various periodic times as other images of the same face are captured. The muscle movements detected can be decomposed into independent Action Units (AU) each having a specific value for the movement of particular facial features, muscles, or groups—See Table 1.

TABLE 1

| Action Unit Code | Muscle Movement |
| --- | --- |
| 1 | Inner Brow Raiser |
| 2 | Outer Brow Raiser |
| 4 | Brow Lowered |
| 26 | Jaw Drop |

Table 1 has a few example muscle movements to illustrate, in part, the mechanics of a coding system and in this and other coding systems many other muscle movements can be coded for in various ways. Here, the simplification can be used to illustrate how an expression based on detected raw expression data can be used to generate an expression type.

In this example, once values are assigned to various muscle positions and movements by the action unit, the expression type of the user can be calculated from a combination of these values summed or otherwise manipulated or categorized by feature to allow comparison to a muscle movement code for expressions—see Table 2.

TABLE 2

| Emotion | Action Units |
| --- | --- |
| Happiness | 6 + 12 |
| Sadness | 1 + 4 + 15 |
| Surprise | 1 + 2 + 5B + 26 |
| Fear | 1 + 2 + 4 + 5 + 20 + 26 |
| Anger | 4 + 5 + 7 + 23 |
| Disgust | 9 + 15 + 16 |
| Contempt | R12A + R14A |

Although the above tables show the use of feature position and muscle movement from visual data, other coding and expression tag generation techniques can be used. In an example, the generation of an expression type can include audio data including voice recognition, pitch detection, and intensity detection. In an example, the calculation type can also use machine learning techniques based on positive and negative results from other similar coding attempts, and can also use feedback from users or other human users to improve expression type calculations. In an example, a learning database can store an action code system and also any system for calculating expression. In an example, the calculation of an expression type can include more than one method of expression calculation and the multiple calculation attempts compared to determine a decided expression type to include in the expression tag.

At block 408, an expression tag can be added to a video and sent to a network for collection with content interval identifiers tagged against each viewing user. The video can be any type of media deliverable content instance or suitable carrier for the expression tag information. The expression tag can include the information discussed above as well as other suitable information to be used in metadata relating to the expression a user made during the presentation of media such as a video. The video can be content of a duration or interval, and the expression tag can include an interval identifier of when the tag was generated relative to the content. The expression tag can also include an interval identifier for each user viewing, as some users can start viewing content midway through the content, leave, and come back, or any other variation in number or presence of viewers. The adding of the expression tag can be through the addition of the expression tag data to metadata of the media deliverable content instance itself. The expression tag can also be associated with the deliverable content instance and stored separately from the deliverable content instance.

At block 410, a network 130 can store the expression tag for bulk collection for later delivery to a content author or system administrator. The network 130 can also store expression tags for direct information on the specific users or media being presented or viewing within the network. In this example, the network can use this information along with instructions from a content author to perhaps tailor the user's future experience and content based on the reactions stored in the network for direct access.

At block 412, a network 130 can make expression tags available to content authors and also to also search engines, video publishers, movie makers, web content authors, bloggers, or any other company or person who can create content deliverable to a user on a device. In this example, the content author can receive the large, bulk collection of expression tags in order to generate statistical analysis on all the information across a broad range of users for the media shown and the resulting expression tag information. This statistical information can be used to effect the future media content generated or displayed to an individual and also to a larger group with statistically similar expressions to similar media.

At block 414, the content authors can adjust the media shown to a user or delivered to a user device based on the expression tags sent after generated from the raw expression data. The adjustment can be in relation to a single user or a group of users consuming the media of the content author.

Even though the process of FIG. 3 appears in a particular order with a certain number of actions, these actions may not all be present, nor do they represent every action that can be performed in the process. Further, the order of the actions and the fact that they are shown as distinct should not be read as limiting on the scope of the present disclosure as any combination and order accomplishing the expression identification aims of the disclosure can also be included in the present disclosure.

Figure 5:
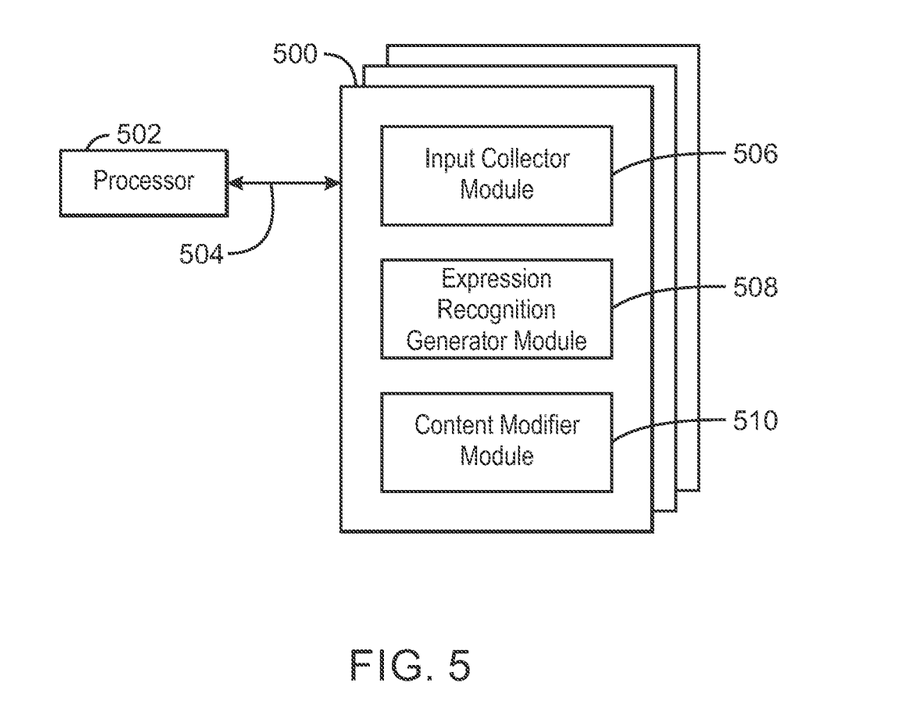
FIG. 5 shows a block diagram showing tangible, non-transitory computer-readable media that stores code for expression recognition tagging.

FIG. 5 shows a block diagram showing tangible, non-transitory computer-readable media 500 that stores code for expression recognition tagging. The tangible, non-transitory computer-readable media 500 may be accessed by a processor 502 over a computer bus 504. Furthermore, the tangible, non-transitory computer-readable medium 500 may include code configured to direct the processor 502 to perform the methods described herein.

The various software components discussed herein may be stored on one or more tangible, non-transitory computer-readable media 500, as indicated in FIG. 5. For example, an input collector module 506 can collect the raw expression data from either a peripheral device connected to the computer-readable media 500, and can also collect raw expression data received from over a network 130 similarly connected to the computer-readable media 500. An expression recognition generation module 508 can generate an expression tag based on the raw expression data collected by the input collector module 506. At block 510, a content modifier module can modify a media deliverable content instance to code in the generated expression tag based on the raw expression data.

The block diagram of FIG. 5 may not intend to indicate that the tangible, non-transitory computer-readable media 500 includes all of the components shown in FIG. 5. Further, the tangible, non-transitory computer-readable media 500 may include any number of additional components not shown in FIG. 5, depending on the details of the specific implementation.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as readily apparent, the advances described above may be applied to any of those interconnects, fabrics, or architectures.

Figure 6:
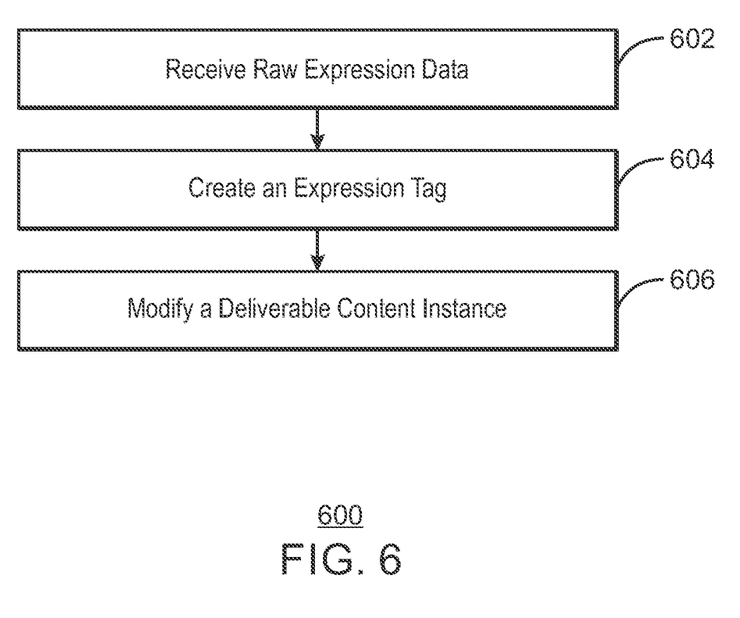
FIG. 6 shows a process flow diagram showing a simplified example method for expression recognition tagging.

FIG. 6 shows a process flow diagram showing a simplified example method 600 for expression recognition tagging. This example method can be implemented with similar variations to the descriptions above and can be implemented on or in concert with the hardware, devices, and apparatuses discussed above and illustrated in the above figures. Process flow for this method can begin at block 602.

At block 602, raw expression data can be received. The raw expression data can be received at or from a client system. In this example the client system can include a viewing screen to view a content of a media deliverable content instance, audio speakers to hear the content, a video capture device to detect facial expression, and a microphone to detect audio generated by a viewer.

At block 604, an expression tag can be created. This expression tag can be generated based on the raw expression data. In an example, a client device can be used to generate the expression tag through the use of facial recognition software to generate an expression tag with an expression type.

At block 606, a deliverable content instance can be modified. In an example, the deliverable content instance modified can be the media deliverable content instance displayed or played to a user on the client device. In an example the deliverable content instance can be modified to include the expression tag generated based on the raw expression data. This deliverable content instance or another that can be modified to include the expression tag can be transmitted to other devices over a connection to a network. The connection to the network can upload and download the deliverable content instance information including content-expression data to and from cloud storage and other types of data storage. In an example the cloud storage or other data storage can receive the expression tag, the raw expression data, and various versions of these two formats for select sections of the content being watched, provided to the client device through the media deliverable content instance. In an example, the cloud or other type of data storage, can expose this data to other producers so that intelligence can be built around content creation.

EXAMPLES

Example 1 is an apparatus for tagging content with expression recognition information. The apparatus includes an input collector to receive raw expression data at a data storage device, the raw expression data to correspond to a media event; an expression recognition generator to create an expression tag by coding the raw expression data to follow an expression action coding system; and a content modifier to generate a deliverable content instance for the media event to comprise the expression tag.

Example 2 includes the apparatus of example 1, including or excluding optional features. In this example, the apparatus includes a port to transmit the deliverable content instance to a network, the expression tag to comprise a media event identifier to allow comparison to other expression tags for the media event.

Example 3 includes the apparatus of any one of examples 1 to 2, including or excluding optional features. In this example, expression tag comprises an expression type, a media event section time, a duration, a timestamp of the time the raw expression data was captured, and a location.

Example 4 includes the apparatus of any one of examples 1 to 3, including or excluding optional features. In this example, the input collector receives the raw expression data at the storage device periodically.

Example 5 includes the apparatus of any one of examples 1 to 4, including or excluding optional features. In this example, the expression tag comprises an identifier for each viewer detected in the raw expression data and codes an expression type for each of the viewers.

Example 6 includes the apparatus of any one of examples 1 to 5, including or excluding optional features. In this example, the expression tag comprises a geographic tag based on a location identifier associated with the raw expression data.

Example 7 includes the apparatus of any one of examples 1 to 6, including or excluding optional features. In this example, the expression action coding system is a facial action coding system to identify a face in the raw expression data and through comparison of periodically received raw expression data determines changes in a facial feature for use in determining an expression type.

Example 8 includes the apparatus of any one of examples 1 to 7, including or excluding optional features. In this example, the raw expression data and the expression tag are sent from data storage device; an expression accuracy value is returned to the apparatus; and the creation of the expression tag is modified based on the expression accuracy value.

Example 9 includes the apparatus of any one of examples 1 to 8, including or excluding optional features. In this example, the media event is an advertisement and the expression recognition generator identifies when the advertisement is viewed based on the raw expression data received by the input collector.

Example 10 includes the apparatus of any one of examples 1 to 9, including or excluding optional features. In this example, the expression tag comprises viewer gaze information generated by the expression recognition generator detecting a location on the display where a viewer is looking from the raw expression data and associates the location to the media event being displayed.

Example 11 is a method for tagging content with expression recognition information. The method includes receiving raw expression data at a data storage device, the raw expression data to correspond to a media event; creating, with an expression recognition generator, an expression tag by coding the raw expression data to follow an expression action coding system; and modify a deliverable content instance for the media event by inserting or associating the expression tag to the deliverable content instance.

Example 12 includes the method of example 11, including or excluding optional features. In this example, the method includes transmitting the deliverable content instance to a network, the expression tag to comprise a media event identifier to allow comparison to other expression tags for the media event.

Example 13 includes the method of any one of examples 11 to 12, including or excluding optional features. In this example, expression tag comprises an expression type, a media event section time, a duration, a timestamp of the time the raw expression data was captured, and a location.

Example 14 includes the method of any one of examples 11 to 13, including or excluding optional features. In this example, the raw expression data is received at the storage device periodically.

Example 15 includes the method of any one of examples 11 to 14, including or excluding optional features. In this example, the expression tag comprises an identifier for each viewer detected in the raw expression data and codes an expression type for each of the viewers.

Example 16 includes the method of any one of examples 11 to 15, including or excluding optional features. In this example, the expression tag comprises a geographic tag based on a location identifier associated with the raw expression data.

Example 17 includes the method of any one of examples 11 to 16, including or excluding optional features. In this example, the expression action coding system is a facial action coding system to identify a face in the raw expression data and through comparison of periodically received raw expression data determines changes in a facial feature for use in determining an expression type.

Example 18 includes the method of any one of examples 11 to 17, including or excluding optional features. In this example, the raw expression data and the expression tag are sent from data storage device; an expression accuracy value is returned to the apparatus; and the creation of the expression tag is modified based on the expression accuracy value.

Example 19 includes the method of any one of examples 11 to 18, including or excluding optional features. In this example, the media event is an advertisement and the expression recognition generator identifies when the advertisement is viewed based on the raw expression data received by the input collector.

Example 20 includes the method of any one of examples 11 to 19, including or excluding optional features. In this example, the expression tag comprises viewer gaze information generated by the expression recognition generator detecting a location on the display where a viewer is looking from the raw expression data and associates the location to the media event being displayed.

Example 21 is a system for tagging content with expression recognition information. The system includes a display to show a media event; an input collector to receive raw expression data at a data storage device, the raw expression data to correspond to the media event; an expression recognition generator to create an expression tag by coding the raw expression data to follow an expression action coding system; and a content modifier to generate a deliverable content instance for the media event to comprise the expression tag.

Example 22 includes the system of example 21, including or excluding optional features. In this example, the system includes transmitting the deliverable content instance to a network, the expression tag to comprise a media event identifier to allow comparison to other expression tags for the media event.

Example 23 includes the system of any one of examples 21 to 22, including or excluding optional features. In this example, expression tag comprises an expression type, a media event section time, a duration, a timestamp of the time the raw expression data was captured, and a location.

Example 24 includes the system of any one of examples 21 to 23, including or excluding optional features. In this example, the input collector receives the raw expression data at the storage device periodically.

Example 25 includes the system of any one of examples 21 to 24, including or excluding optional features. In this example, the expression tag comprises an identifier for each viewer detected in the raw expression data and codes an expression type for each of the viewers.

Example 26 includes the system of any one of examples 21 to 25, including or excluding optional features. In this example, the expression tag comprises a geographic tag based on a location identifier associated with the raw expression data.

Example 27 includes the system of any one of examples 21 to 26, including or excluding optional features. In this example, the expression action coding system is a facial action coding system to identify a face in the raw expression data and through comparison of periodically received raw expression data determines changes in a facial feature for use in determining an expression type.

Example 28 includes the system of any one of examples 21 to 27, including or excluding optional features. In this example, the display shows a second media event based on the expression tag applied to the media event.

Example 29 includes the system of any one of examples 21 to 28, including or excluding optional features. In this example, the media event is an advertisement and the expression recognition generator identifies when the advertisement is viewed based on the raw expression data received by the input collector.

Example 30 includes the system of any one of examples 21 to 29, including or excluding optional features. In this example, the expression tag comprises viewer gaze information generated by the expression recognition generator detecting a location on the display where a viewer is looking from the raw expression data and associates the location to the media event being displayed.

Example 31 includes the system of any one of examples 21 to 30, including or excluding optional features. In this example, the power supply comprises a voltage generator and a rectifier capacitor to generate a rectified voltage for a power amplifier.

Example 32 includes the system of any one of examples 21 to 31, including or excluding optional features. In this example, the tuning antenna resonator is compliant with the alliance for wireless power (A4WP) standard.

Example 33 is a computing device for tagging content with expression recognition information. The computing device includes a processor; means to receive raw expression data at a data storage device, the raw expression data to correspond to a media event; means to create an expression tag by coding the raw expression data to follow an expression action coding system; and means to generate a deliverable content instance for the media event to comprise the expression tag.

Example 34 includes the computing device of example 33, including or excluding optional features. In this example, the computing device includes a port to transmit the deliverable content instance to a network, the expression tag to comprise a media event identifier to allow comparison to other expression tags for the media event.

Example 35 includes the computing device of any one of examples 33 to 34, including or excluding optional features. In this example, expression tag comprises an expression type, a media event section time, a duration, a timestamp of the time the raw expression data was captured, and a location.

Example 36 includes the computing device of any one of examples 33 to 35, including or excluding optional features. In this example, the input collector receives the raw expression data at the storage device periodically.

Example 37 includes the computing device of any one of examples 33 to 36, including or excluding optional features. In this example, the expression tag comprises an identifier for each viewer detected in the raw expression data and codes an expression type for each of the viewers.

Example 38 includes the computing device of any one of examples 33 to 37, including or excluding optional features. In this example, the expression tag comprises a geographic tag based on a location identifier associated with the raw expression data.

Example 39 includes the computing device of any one of examples 33 to 38, including or excluding optional features. In this example, the expression action coding system is a facial action coding system to identify a face in the raw expression data and through comparison of periodically received raw expression data determines changes in a facial feature for use in determining an expression type.

Example 40 includes the computing device of any one of examples 33 to 39, including or excluding optional features. In this example, the raw expression data and the expression tag are sent from data storage device; an expression accuracy value is returned to the apparatus; and the creation of the expression tag is modified based on the expression accuracy value.

Example 41 includes the computing device of any one of examples 33 to 40, including or excluding optional features. In this example, the media event is an advertisement and the expression recognition generator identifies when the advertisement is viewed based on the raw expression data received by the input collector.

Example 42 includes the computing device of any one of examples 33 to 41, including or excluding optional features. In this example, the expression tag comprises viewer gaze information generated by the expression recognition generator detecting a location on the display where a viewer is looking from the raw expression data and associates the location to the media event being displayed.

Example 43 is a tangible, non-transitory, computer-readable medium. The computer-readable medium includes instructions that direct the processor to receive raw expression data at a data storage device, the raw expression data to correspond to a media event; create, with an expression recognition generator, an expression tag by coding the raw expression data to follow an expression action coding system; and modify a deliverable content instance for the media event by inserting or associating the expression tag to the deliverable content instance.

Example 44 includes the computer-readable medium of example 43, including or excluding optional features. In this example, the computer-readable medium includes instructions that transmit the deliverable content instance to a network, the expression tag to comprise a media event identifier to allow comparison to other expression tags for the media event.

Example 45 includes the computer-readable medium of any one of examples 43 to 44, including or excluding optional features. In this example, expression tag comprises an expression type, a media event section time, a duration, a timestamp of the time the raw expression data was captured, and a location.

Example 46 includes the computer-readable medium of any one of examples 43 to 45, including or excluding optional features. In this example, the raw expression data is received at the storage device periodically.

Example 47 includes the computer-readable medium of any one of examples 43 to 46, including or excluding optional features. In this example, the expression tag comprises an identifier for each viewer detected in the raw expression data and codes an expression type for each of the viewers.

Example 48 includes the computer-readable medium of any one of examples 43 to 47, including or excluding optional features. In this example, the expression tag comprises a geographic tag based on a location identifier associated with the raw expression data.

Example 49 includes the computer-readable medium of any one of examples 43 to 48, including or excluding optional features. In this example, the expression action coding system is a facial action coding system to identify a face in the raw expression data and through comparison of periodically received raw expression data determines changes in a facial feature for use in determining an expression type.

Example 50 includes the computer-readable medium of any one of examples 43 to 49, including or excluding optional features. In this example, the raw expression data and the expression tag are sent from data storage device; an expression accuracy value is returned to the apparatus; and the creation of the expression tag is modified based on the expression accuracy value.

Example 51 includes the computer-readable medium of any one of examples 43 to 50, including or excluding optional features. In this example, the media event is an advertisement and the expression recognition generator identifies when the advertisement is viewed based on the raw expression data received by the input collector.

Example 52 includes the computer-readable medium of any one of examples 43 to 51, including or excluding optional features. In this example, the expression tag comprises viewer gaze information generated by the expression recognition generator detecting a location on the display where a viewer is looking from the raw expression data and associates the location to the media event being displayed.

A design may go through various stages, from creation to simulation to fabrication. Data representing a design may represent the design in a number of manners. First, as found useful in simulations, the hardware may be represented using a hardware disclosure language or another functional disclosure language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design can be transmitted, to the extent that copying, buffering, or re-transmission of the electrical signal can be performed, a new copy can be made. Thus, a communication provider or a network provider may store on a tangible, machine-readable medium, at least temporarily, an article, such as information encoded into a carrier wave, embodying techniques of embodiments of the present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which can be specifically configured to recognize and/or execute the code to be held on a non-transitory medium. Furthermore, in another embodiment, use of a module refers to the non-transitory medium including the code, which can be specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that may not operate can still be 'configured to' perform a designated task if the design, coupling, and/or interconnecting allows the performance of the said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate can be one coupled in some manner that during operation the 1 or 0 output can enable the clock. Note once again that use of the term 'configured to' may not operate, but instead focus on the latent state of an apparatus, hardware, and/or element, where in the latent state the apparatus, hardware, and/or element can be designed to perform a particular task when the apparatus, hardware, and/or element may be operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element may not be operating but can be designed in such a manner to enable use of an apparatus in a specified manner.

A value, as used herein, includes any known representation of a number, a state, a logical state, or a binary logical state. Often, the use of logic levels, logic values, or logical values can also be referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but may not be limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment can be included in at least one embodiment of the present techniques. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed disclosure has been given with reference to specific exemplary embodiments. Various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus for tagging content with expression recognition information, comprising: an input collector to receive raw expression data at a data storage device, the raw expression data to correspond to a media event; an expression recognition generator to create an expression tag for a section of the media event by coding the raw expression data to follow an expression action coding system, the expression action coding system to vary the expression tag created based on a world region detected from the raw expression data wherein the expression action coding system is a facial action coding system to identify a face in the raw expression data and through comparison of periodically received raw expression data determines changes in a facial feature for use in determining an expression type, wherein the expression tag comprises the expression type; and the generation of the expression tag is based on at least one of voice recognition, pitch detection, or intensity detection; and a content modifier to generate a deliverable content instance for the media event and add the expression tag to the deliverable content instance.

2. The apparatus of claim 1, comprising a port to transmit the deliverable content instance to a network, the expression tag to comprise a media event identifier to allow comparison to other expression tags for the media event.

3. The apparatus of claim 1, wherein expression tag comprises the expression type, a media event section time, a duration, a timestamp of the time the raw expression data was captured, and a location.

4. The apparatus of claim 1, wherein the input collector receives the raw expression data at the storage device periodically.

5. The apparatus of claim 1, wherein the expression tag comprises an identifier for each viewer detected in the raw expression data and codes an expression type for each of the viewers.

6. The apparatus of claim 1, wherein the expression tag comprises a geographic tag based on a location identifier associated with the raw expression data.

7. The apparatus of claim 1, wherein
the raw expression data and the expression tag are sent from data storage device;
an expression accuracy value is returned to the apparatus; and
the creation of the expression tag is modified based on the expression accuracy value.

8. A method for tagging content with expression recognition information, comprising: receiving raw expression data at a data storage device, the raw expression data to correspond to a media event; creating, with an expression recognition generator, an expression tag for a section of the media event by coding the raw expression data to follow an expression action coding system, the expression action coding system to vary the expression tag created based on a world region detected from the raw expression data wherein the expression action coding system is a facial action coding system to identify a face in the raw expression data and through comparison of periodically received raw expression data determines changes in a facial feature for use in determining an expression type, wherein the expression tag comprises the expression type; the generation of the expression tag is based on at least one of voice recognition, pitch detection, or intensity detection; and modify a deliverable content instance for the media event by adding the expression tag to the deliverable content instance.

9. The method of claim 8, comprising transmitting the deliverable content instance to a network, the expression tag to comprise a media event identifier to allow comparison to other expression tags for the media event.

10. The method of claim 8, wherein expression tag comprises the expression type, a media event section time, a duration, a timestamp of the time the raw expression data was captured, and a location.

11. The method of claim 8, wherein the raw expression data is received at the storage device periodically.

12. The method of claim 8, wherein the expression tag comprises an identifier for each viewer detected in the raw expression data and codes an expression type for each of the viewers.

13. The method of claim 8, wherein the expression tag comprises a geographic tag based on a location identifier associated with the raw expression data.

14. A system for tagging content with expression recognition information, comprising: a display to show a media event; an input collector to receive raw expression data at a data storage device, the raw expression data to correspond to the media event; an expression recognition generator to create an expression tag for a section of the media event by coding the raw expression data to follow an expression action coding system, the expression action coding system to vary the expression tag created based on a world region detected from the raw expression data wherein the expression action coding system is a facial action coding system to identify a face in the raw expression data and through comparison of periodically received raw expression data determines changes in a facial feature for use in determining an expression type, wherein the expression tag comprises the expression type; the generation of the expression tag is based on at least one of voice recognition, pitch detection, or intensity detection; and a content modifier to generate a deliverable content instance for the media event and add the expression tag to the deliverable content instance.

15. The system of claim 14, comprising transmitting the deliverable content instance to a network, the expression tag to comprise a media event identifier to allow comparison to other expression tags for the media event.

16. The system of claim 14, wherein expression tag comprises the expression type, a media event section time, a duration, a timestamp of the time the raw expression data was captured, and a location.

17. The system of claim 14, wherein the input collector receives the raw expression data at the storage device periodically.

18. The system of claim 14, wherein the expression tag comprises an identifier for each viewer detected in the raw expression data and codes an expression type for each of the viewers.

19. The system of claim 14, wherein the expression tag comprises a geographic tag based on a location identifier associated with the raw expression data.

20. The system of claim 14, wherein the display shows a second media event based on the expression tag applied to the media event.

21. The system of claim 14, wherein the media event is an advertisement and the expression recognition generator identifies when the advertisement is viewed based on the raw expression data received by the input collector.

22. The system of claim 14, wherein the expression tag comprises viewer gaze information generated by the expression recognition generator detecting a location on the display where a viewer is looking from the raw expression data and associates the location to the media event being displayed.

23. The apparatus of claim 1, wherein the section of the media event is a time period during the media where the expression may have been recorded.

24. The apparatus of claim 1, wherein the section of the media event is filtered out of the raw expression data.

* * * * *